May 25, 1943.  G. W. DOOLEY ET AL  2,319,921
POWER SHOVEL
Filed Oct. 6, 1941  3 Sheets-Sheet 1

Witness
L. M. Dietz

Inventors
George W. Dooley
Ernest W. Baldwin
Carter C. Baldwin

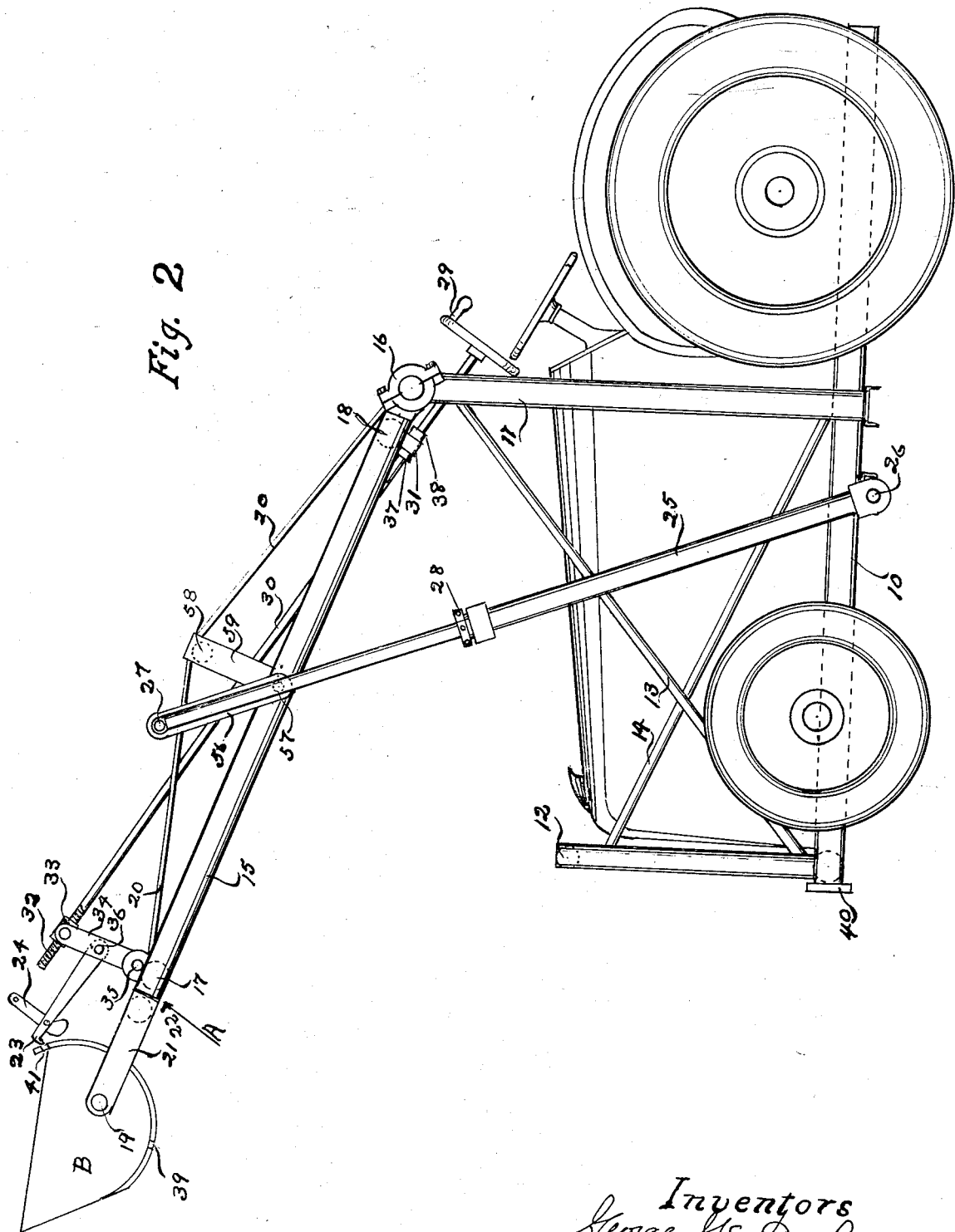

May 25, 1943.  G. W. DOOLEY ET AL  2,319,921
POWER SHOVEL
Filed Oct. 6, 1941  3 Sheets-Sheet 3
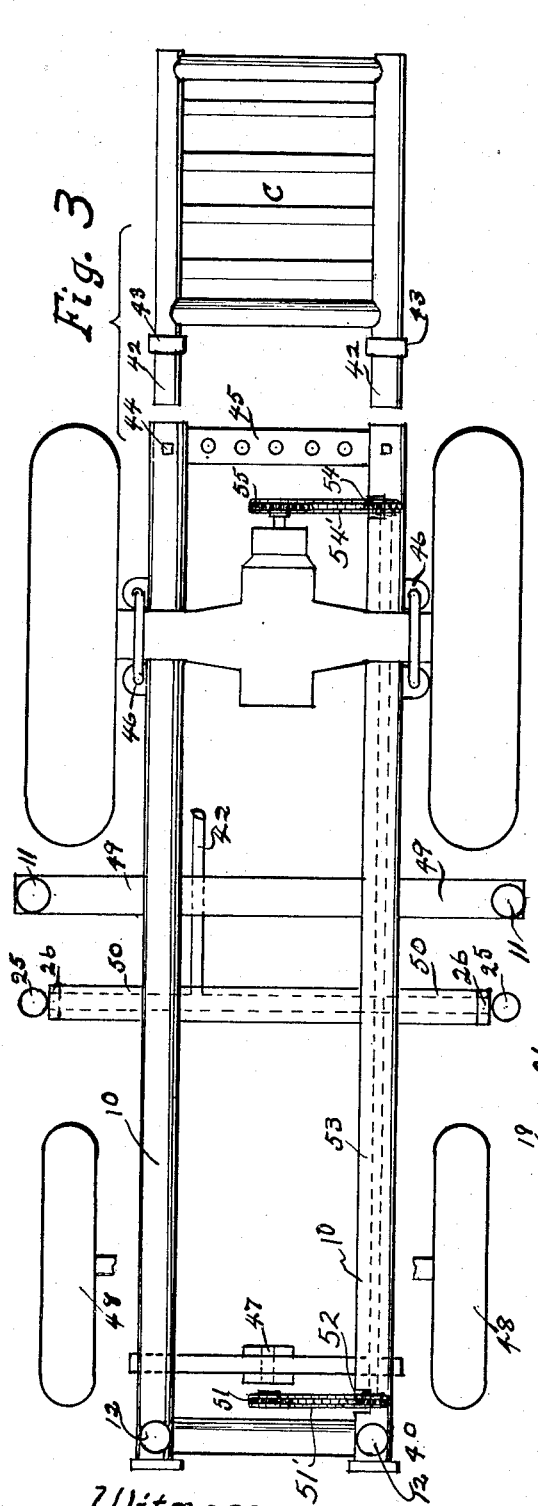
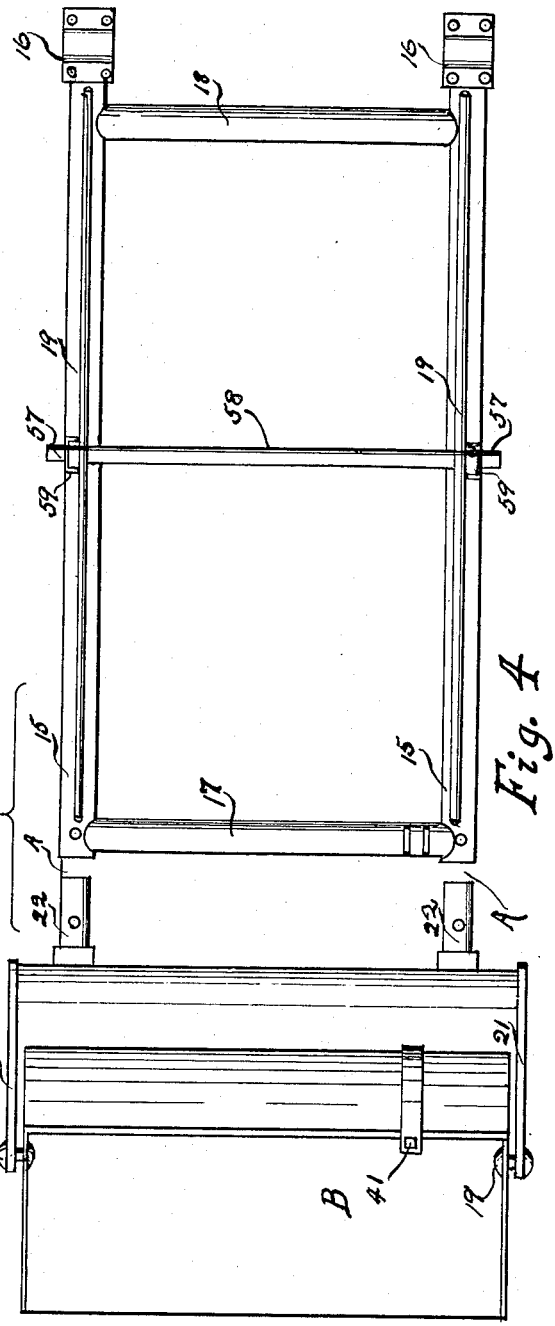
Witness
L. M. Dietz
Inventors,
George W. Dooley
Ernest W. Baldwin Patented May 25, 1943

2,319,921

UNITED STATES PATENT OFFICE 2,319,921

POWER SHOVEL

George W. Dooley, Ernest W. Baldwin, and Curtis C. Baldwin, Ottawa, Kans.

Application October 6, 1941, Serial No. 413,798

7 Claims. (Cl. 214—140)

The present invention relates to power shovels and the like, for handling dirt, or other substances.

And more particularly to a hydraulically operated shovel designed for attachment and use with a tractor such as the Ford that is equipped with a hydraulic pump and other apparatus for lifting loads.

One of the essential features of this invention is the manner in which the equipment is arranged on a tractor for quick and convenient attachment or detachment, also the manner in which the line of draught acts, to put weight on the rear or driving wheels of the tractor to cause a maximum amount of traction when the scoop is being pushed ahead into the material that is being shoveled.

Another feature, is the way in which the lifting arms, that carry the scoop are arranged to stop the front end of the tractor from raising too far up when a hard push is exerted by the rear or traction wheels.

Another advantageous feature is the adjustability of the scoop, in relation to the ground, to obtain the most suitable angle of attack when shoveling different types of dirt, such as top soil, clay, sand, rocks, etc.

Another object of this invention is to provide a means of driving the hydraulic pressure pump, which, conventionally, is arranged to be driven by the power take-off shaft, said power take-off shaft, on the majority of present day tractors, only rotates when the tractor clutch is engaged—hence the hydraulic pump stops when the clutch is disengaged for shifting gears, etc.

To eliminate this objection we have provided a new and novel means of driving said pressure pump from the front end of the tractor motor so that it is not affected when the tractor clutch is disengaged. This arrangement allows the scoop to be raised without interruption caused by shifting gears, or disengagement of the tractor clutch for any reason.

Other objects, features, and advantages of the invention may be apparent from the accompanying drawings, specification and the appended claims.

In the drawings of which there are three sheets:

Figure 2 is the same as Figure 1 except that it shows the scoop in raised position to illustrate the bail action.

Figure 3 is a plan view of the main frame showing points of attachment to the tractor, and location of the upright posts and the hydraulic rams, to afford easy attachment, or detachment, to a tractor, also the method of taking power from the front of the tractor to the rear, to by-pass the tractor clutch, and showing a frame extension to carry extra weight.

Figure 4 is a plan view of the lifting arms, showing the manner in which different tools, other than a scoop, may be attached for use with the same general plan of the rest of the apparatus.

Figure 1:
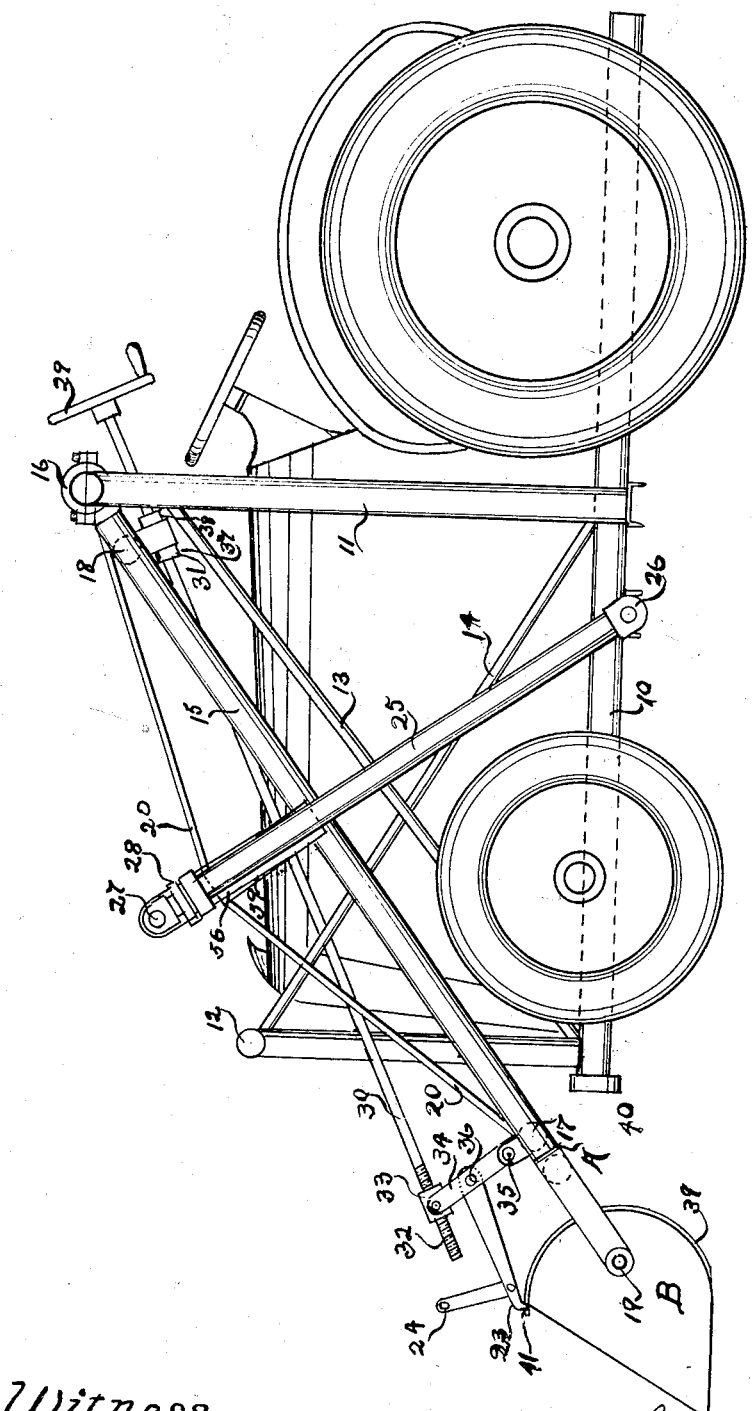
Figure 1 is a side elevation of a conventional tractor having mounted thereon a main frame carrying lifting arms, scoop and hydraulic rams, shown with the scoop in lowered position.

The apparatus of this invention consists of frame sills 10, upright posts 11, radiator protector 12, with its bracings 13 and 14, respectively, lifting arms 15, journaled at their one end in bearings 16, their other end, terminating at a point designated at A; these are preferably constructed of tubing or pipe, and are braced by cross members 17 and 18 also of pipe and are trussed by rods 20. B is a scoop, journaled for dumping, at pins 19 which are attached to lifting arms 15 by means of arms 21 which are separable from arms 15 at the point designated at A by having stems 22 extending from arms 21 to slide inside of arms 15, best shown in Figure 4. 23 is a latch designed to hold both ways in notch 41 until tripped by pulling lever 24, which, on account of the cam design, prys latch 23 out of its socket; 25 is a hydraulic cylinder and piston, which is herein called a ram, of which there are preferably two, their cylinders journaled for oscillating movement at 26, and their pistons journaled for oscillating movement at 27 and having packing glands 28; 29 is a hand wheel, located convenient to tractor seat to rotate shaft 30 which is journaled at one end in bearing 31, and having threads 32 to operate in threaded nut 33, which is pivotally attached to arms 34; arm 34 is pivoted for oscillating movement at 35 and is also pivotally connected to latch 23 at 36; by turning the hand wheel 29 and shaft 30 which are in fixed relation, longitudinally, to arms 15 by means of collars 37 and 38 on each side of bearing 31; nut 33 and lever 34 are caused to move forward or back as the case may be, and exerting a push or pull on latch 23 which will, in turn, tip the point of the scoop B down or up as may be preferred.

When the scoop is filled, the operator has only to open the valve of the conventional tractor pump and admit oil, under pressure, into the lower end of the rams which are connected to said pump by a convenient conduit 42, partially shown in dotted lines, such as pipe or hose, with sufficient pressure, rams will extend and lift the scoop to its position shown in Figure 2. By having a rope (not shown) connected to lever 24, and extending it to the operator, latch 23 may be disengaged and contents of the scoop dumped at any desired point within its range; 39 is another notch for latch 23 to catch in for holding the scoop in dumping position long enough for all dirt to spill out and also to hold the scoop stiff so that it may be used as a scraper to level off the dirt on a loaded truck, or the like.

When the tractor is pushing scoop B into a pile of dirt the line of draught is exerted at journals 16 which is high enough that when the push is very great, the front wheels of the tractor are raised off the ground and lifted up until the bumpers 40 strike the cross member 17 of the lifting arms 15, thus putting the entire weight of the tractor and frame plus part of the weight of the scoop on the rear or driving wheel of the tractor thus furnishing the maximum traction without carrying extra weight when not needed on the traction wheels.

C of Figure 3 is an extension for carrying extra weight on the rear of the tractor and may be connected to the main frame by sliding its ends 42 into the open ends of the main frame up to stop collars 43 and held into position by such means as set screws 44; 45 is a draw bar for use when the extension C is left off.

The rear end of the main frame is attached to the rear of the tractor by such means as U bolts through lugs 46, while the front end of the main frame is connected at 47 to the tractor casting thus forming a 3 point suspension to eliminate twist on the tractor engine castings.

In order to have room for rams long enough to lift the scoop to the desired height, it is necessary to use a bail action to elevate the point at 27, above the arms 15, and also maintain the same leverage to lift any load to the maximum height, that the rams have power to start from the ground. Therefore, arms 56 link between the upper end of the ram at 27 and point of attachment to the lifting arms at 57 to establish a swinging bail effect as illustrated in Figure 2. 58 is an integral cross member between truss posts 59.

The procedure of connecting this apparatus to a tractor is to have the main frame lying on the ground with the scoop also resting on the ground, then to drive the front wheels 48 of the tractor over the cross members 49 and 50 and between uprights 11, also rams 25, these being spaced wider than the tread of the front wheels, purposely for this convenience, then to lift the main frame and connecting at 46 and 47. The apparatus is ready to be carried by the tractor and is ready for operation when pressure conduit 42 is connected to the tractor oil pump.

A more satisfactory method of driving the pressure pump, which is conventionally built into the tractor gear housing, and driven by the power take-off shaft, is accomplished by shifting the power take-off shaft out of gear, then by taking power from sprocket 51 which is driven from an extension (not shown) from the front end of the engine shaft through a chain 51' to sprocket 52, and through shaft 53, journaled for rotation in main frame members 10, to sprocket 54; thence, through chain 54' to sprocket 55, which is mounted on the outside end of the power take- off shaft and through this shaft, back into the gear housing to the pump.

Having thus described our invention what we claim is:

1. In a power shovel of the character described, a frame adapted for attachment to a tractor; means for securing the frame to the tractor in a substantially horizontal position beneath the body of the tractor and between the wheels thereof; posts on the frame; arms, having material carrying means thereon, pivotally secured to the posts; an hydraulic ram pivotally secured to the frame, and a link interconnecting the upper end of the ram with said arms for moving the latter about their pivotal connections with the posts.

2. In a power shovel of the character described, a frame adapted for attachment to a tractor; means for securing the frame to the tractor in a substantially horizontal position beneath the body of the tractor and between the wheels thereof; a cross member on the frame having ends projecting beyond the longitudinal sides of the tractor body posts on the ends of the cross member; arms, having material carrying means thereon, pivotally secured to the posts; and an hydraulic ram joining the frame and said arms for moving the latter about their pivotal connections with the posts, said frame having an extension thereon projecting rearwardly beyond the end of the tractor to receive ballast.

3. In a power shovel of the character described, a frame adapted for attachment to a tractor; means for securing the frame to the tractor in a substantially horizontal position beneath the body of the tractor and between the wheels thereof; posts on the frame; arms, having material carrying means thereon, pivotally secured to the posts; an hydraulic ram pivotally secured to the frame, and a link interconnecting the upper end of the ram with said arms for moving the latter about their pivotal connections with the posts, said material carrying means and the extremities of said arms being forward of the tractor and the forward end of the frame, said frame having an extension thereon projecting rearwardly beyond the end of the tractor and the rear end of the frame to support ballast in a counteracting position with respect to the material carrying means.

4. In a power shovel of the character described, a frame adapted for attachment to a tractor; means for securing the frame to the tractor in a substantially horizontal position beneath the body of the tractor and between the wheels thereof; posts on the frame; arms, having material carrying means thereon, pivotally secured to the posts; and an hydraulic ram joining the frame and said arms for moving the latter about their pivotal connections with the posts, said means for securing the frame to the tractor comprising a connector at each side of the frame adjacent to the rear end of the tractor and the frame, and a connector securing the forward end of the frame to the forward end of the tractor on the longitudinal axis of the latter.

5. In a power shovel of the character described, a frame adapted for attachment to a tractor; means for securing the frame to the tractor in a substantially horizontal position beneath the body of the tractor and between the wheels thereof; transverse cross members on the frame between the front and rear wheels of the tractor projecting beyond the longitudinal sides of the tractor body; a vertical post on each end respectively fo one of the cross arms; a ram on each end respectively of one of the cross arms; a pair of forwardly extending arms pivotally carried by the upper ends of the vertical posts; a scoop pivotally disposed between the forward ends of the arms; and links interconnecting the upper end of each of the rams respectively with the arms at points between the posts and said scoop.

6. In a power shovel of the character described, a frame adapted for attachment to a tractor; means for securing the frame to the tractor in a substantially horizontal position beneath the body of the tractor and between the wheels thereof; transverse cross members on the frame between the front and rear wheels of the tractor projecting beyond the longitudinal sides of the tractor body; a vertical post on each end respectively of one of the cross arms; a ram on each end respectively of one of the cross arms; a pair of forwardly extending arms pivotally carried by the upper ends of the vertical posts; a scoop pivotally disposed between the forward ends of the arms; and links interconnecting the upper end of each of the rams respectively with the arms at points between the posts and said scoop, said arms having a cross brace immediately behind the scoop and in front of the forward end of the said frame to be engaged by the frame during certain stages of the operation of the power shovel and tractor.

7. In a power shovel of the character described, a frame adapted for attachment to a tractor; means for securing the frame to a tractor in a substantially horizontal position beneath the body of the tractor and between the wheels thereof; a vertical post carried by the frame on each side respectively of the tractor; a ram carried by the frame on each side respectively of the tractor; a pair of forwardly extending arms pivotally carried by the upper ends of the vertical posts; a scoop pivotally disposed between the forward ends of the arms; and links interconnecting the upper end of each of the rams respectively with the arms at points between the posts and said scoop.

GEORGE W. DOOLEY.
ERNEST W. BALDWIN.
CURTIS C. BALDWIN.